United States Patent [19]

Walter

[11] Patent Number: 4,635,675
[45] Date of Patent: Jan. 13, 1987

[54] FLAT SIDED BALL VALVE

[75] Inventor: John F. Walter, North Kingston, R.I.

[73] Assignee: Crosby Valve & Gage Company, Wrentham, Mass.

[21] Appl. No.: 311,705

[22] Filed: Oct. 15, 1981

[51] Int. Cl.[4] .............................................. F16K 5/06
[52] U.S. Cl. ................................. 137/315; 251/312; 251/315
[58] Field of Search ................. 251/312, 315; 137/315

[56] References Cited

U.S. PATENT DOCUMENTS

| | | | |
|---|---|---|---|
| 3,269,692 | 8/1966 | Shafer | 251/172 |
| 3,348,805 | 10/1967 | Sanctuary | 251/315 |
| 3,501,127 | 3/1970 | Freeman | 251/175 |
| 3,545,721 | 12/1970 | Galt et al. | 251/309 |
| 3,712,584 | 1/1973 | Feiring | 251/162 |
| 3,891,183 | 6/1975 | Feiring | 251/315 |
| 3,893,469 | 7/1975 | Baker | 137/584 |
| 4,140,149 | 2/1979 | Laignel et al. | 137/329.01 |
| 4,252,691 | 4/1981 | Kacal | 252/478 |
| 4,262,691 | 4/1981 | Kacal | 137/315 |

FOREIGN PATENT DOCUMENTS 797757 7/1958 United Kingdom ............... 251/312

Primary Examiner—Martin P. Schwadron
Assistant Examiner—Sheri M. Novack
Attorney, Agent, or Firm—Kenway & Jenney

[57] ABSTRACT

A top-entry, single-body ball valve is provided which may easily be assembled or disassembled. The valve includes a rotatably mounted ball member having a passage extending therethrough, a valve seat for sealingly engaging the ball member, the ball member including a flattened portion which will not engage the valve seat when positioned adjacent thereto. When the flattened portion is adjacent the valve seat, the ball member may easily be removed from the valve chamber without having to first retract the seat.

8 Claims, 5 Drawing Figures

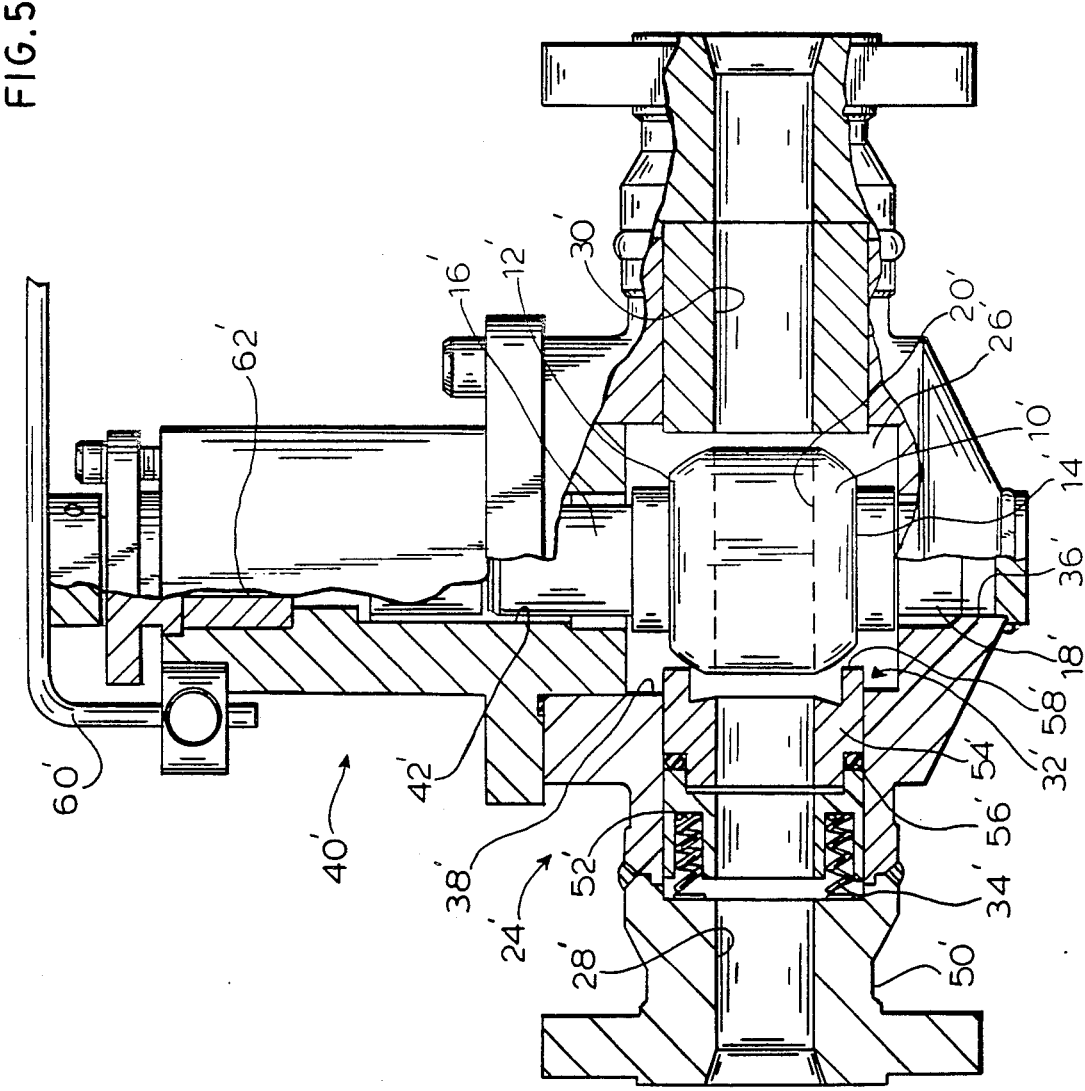

FLAT SIDED BALL VALVE

BACKGROUND OF THE INVENTION

1. Field of the Invention

The field of the invention relates to ball valves and means and methods for disassembling such valves.

2. Brief Description of the Prior Art

In top-entry, single-body ball valves it is necessary to push back the valve seats in order to remove or insert the ball member of such valves. In certain applications such as coal gasification/liquefaction, the spaces behind the seats become coked or clogged with solids. This makes retraction of the seats difficult when the valve is to be assembled or disassembled.

U.S. Pat. No. 3,891,183 discloses a trunnion-type ball valve having a ball which is rotatable between open and closed positions. A seat and sealing assembly is provided for engagement with a seating surface of the ball. Spring means urge a sealing lip of the sealing assembly towards the ball.

U.S. Pat. No. 4,262,691 discloses a top-entry trunnion ball valve wherein the ball member is provided with cams for moving the seat rings to a retracted position. Separate retainers hold the seat rings in a retracted position while the ball member is removed. A detachable cover plate is provided to permit such removal.

U.S. Pat. Nos. 3,269,692, 3,348,805, 3,501,127, 3,545,721, 3,712,584, 3,893,469 and 4,140,149 disclose various trunnion valves and rotary plug valves which are representative of the present state of the art.

SUMMARY OF THE INVENTION

A top-entry or bottom-entry single body ball valve is provided. The valve includes a ball member having a passage extending therethrough, seating means, means for rotating said ball member, a first external surface portion of said ball member capable of sealingly engaging the seating means when the ball member is rotated to a first position, and a second external surface portion of said ball member which will not sealingly engage the seating means when positioned adjacent thereto when the ball member is rotated to a second position.

The valve includes a housing assembly having an opening sealed by a removable bonnet. When the bonnet is removed, the ball member may be withdrawn through this opening after being rotated to the second position described above. Mechanical stops may be provided for preventing the ball member from assuming the second position unless its removal is desired.

The valve according to the present invention is advantageous in that it is unnecessary to retract the seating means prior to removal of the ball member. Disassembly is accordingly facilitated, especially where coking or other forms of clogging within the valve make seat retraction difficult.

BRIEF DESCRIPTION OF THE DRAWINGS

FIG. 5 is a sectional view of a second embodiment of the invention.

DETAILED DESCRIPTION OF THE INVENTION

Figure 1:
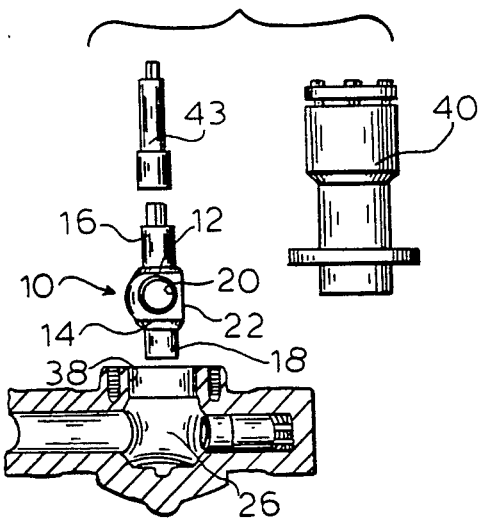
FIG. 1 is an exploded perspective view of a valve assembly according to the present invention.
Figure 2:
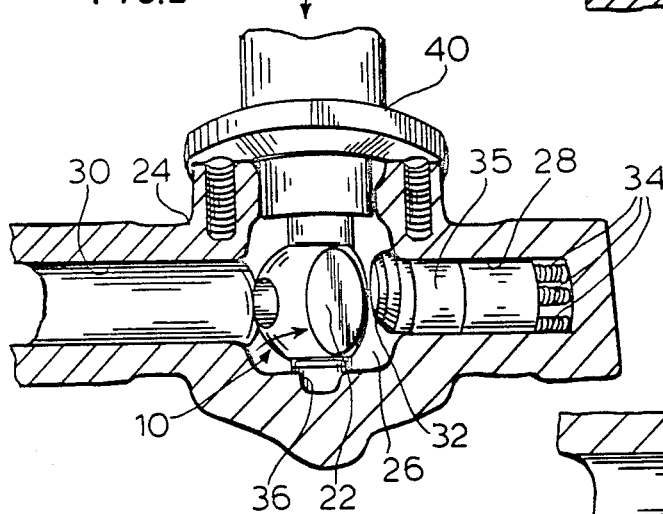
FIG. 2 is a side elevation view showing the ball member of the valve within the valve chamber.

An exploded view of a valve assembly according to the invention is provided in FIG. 1. The assembly includes a ball member 10 having flattened top and bottom portions 12, 14 on an otherwise generally spherical body. Top and bottom stems 16, 18 extend from the top and bottom portions 12, 14 through the axis of rotation of said member. A bore 20 having an axis perpendicular to said axis of rotation extends through the ball member. The ball member has a spherical surface between the bore openings on one side thereof. The opposite side includes a flattened portion 22 which defines a plane parallel to both the bore axis and the axis of rotation.

The ball member 10 and stems 16, 18 are adapted to fit within a housing assembly 24. The housing assembly includes a valve chamber 26 within which the valve is positioned. Upstream and downstream conduits 28, 30 enter the chamber 26 on opposite sides thereof. The ball member is located such that the bore openings are aligned with the conduits 28, 30 in the "open" position.

A valve seat 32 is positioned near the upstream side of the valve chamber for engaging the spherical surface of the ball member while in the "closed" position. The valve seat 32 is urged towards the ball member by means of a plurality of compression springs 34. The compression springs 34 exert a force upon the seat 32 through a packing assembly 35 positioned within the conduit 28.

The housing assembly 24 is closed at the bottom and includes a bore 36 for receiving the bottom stem 18 of the ball member 10. The top of the housing assembly is open, the opening 38 being of sufficient size to permit the removal or insertion of the ball member. A bonnet 40 serves to close this opening 38 during normal operation of the valve. The bonnet 40 includes an axial passage 42 for receiving the top stem 16 of the ball member and any extension 43 thereof. Mechanical stops may be provided within the bonnet for limiting the extent to which the ball member be rotated by means of the top stem 16, which is integral with the ball member or mechanically engaged.

Figure 3:
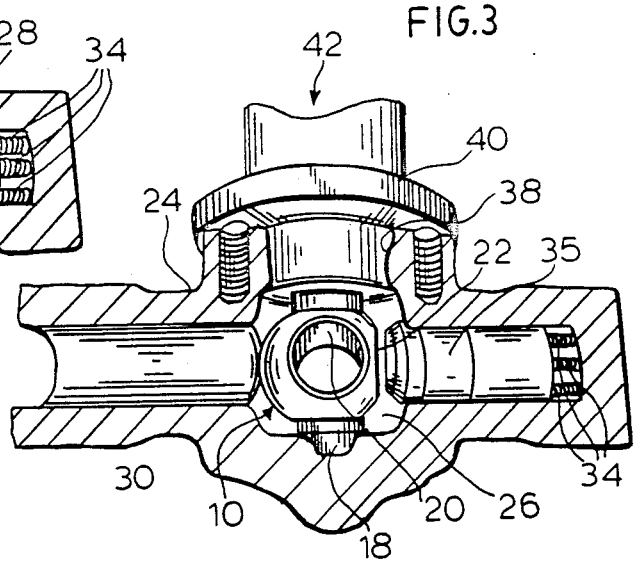
FIG. 3 is a side elevation view showing the flat side of the ball facing the valve seat.

In operation, the ball member may be rotated to the position shown in FIG. 3 to allow a liquid to pass therethrough. In this open position, the bore 20 is aligned with the upstream and downstream conduits 28, 30.

To close the valve, the ball member is rotated so that its spherical surface is in sealing engagement with the valve seat 32.

Figure 4:
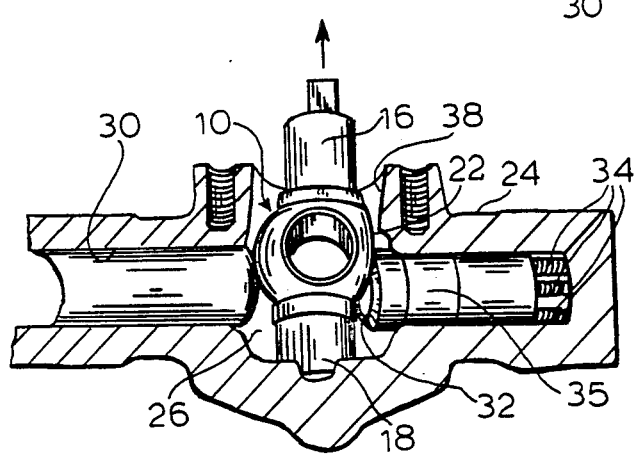
FIG. 4 is a side elevation view illustrating the removal of the ball from the valve housing.

The valve is disassembled by initially positioning the ball member such that its flat side portion 22 faces the valve seat 32. There will be little or no pressure exerted by the valve seat upon the ball member in this position. As shown in FIG. 3, a gap may even be present between these two members. The bonnet 40 is unscrewed from the housing assembly 24 allowing the removal of the ball member 10 through the opening 38. FIG. 4 illustrates this step. The final step would be to pull the seat 32 into the chamber 26 left by the ball member 10 and to lift the seat and other internals out through the top opening 38.

Reassembly follows essentially the same procedure except that a holding cup is used to hold the seat back against the springs while the ball member 10 is inserted and rotated to the closed position. The holding cup is cylindrical and fits down into the valve chamber maintaining the seat 32 in the compressed position. The inner diameter of the cylinder is large enough to permit the ball member to slide therethrough. Once the ball is in position, the holding cup, which is attached by bolts in the bonnet stud holes, is removed.

A second embodiment of the invention is shown in FIG. 5. This figure illustrates a valve seating assembly in greater detail than the previous figures. However, it should be appreciated that other such assemblies may be employed in conjunction with the invention. U.S. Pat. No. 3,891,183 illustrates one such alternative seating assembly.

The valve assembly shown in FIG. 6 includes a ball member 10' having flattened top and bottom portions 12', 14' on an otherwise generally spherical body. The ball member 10' may be formed with top and bottom stems 16', 18' through the axis of rotation thereof. A cylindrical bore 20' having an axis perpendicular to the axis of rotation extends through the ball member. One surface portion of the ball member intermediate the bore openings and the stems has a spherical configuration. The surface portion diametrically opposite thereto is flat, although other positions than diametrically are possible.

The ball member 10' and stems 16', 18' fit within a valve housing assembly 24'. The housing assembly includes a chamber 26' within which the ball member 10' is positioned. Upstream and downstream conduits 28', 30' enter the chamber 26' from opposite sides thereof.

A valve seating assembly 32' is positioned within the conduit 28' near the upstream side of the valve. Compression springs 34' act between a rear flanged member 50' and an intermediate member 52' to urge an axially movable member 54' towards the ball member 10'. Sealing rings 56' are provided between the intermediate and axially movable members. The latter includes a flexible sealing lip 58' for engaging the ball member. No seating assembly is provided on the opposite side of the ball member.

The housing assembly 24' may be closed at the bottom and includes a bore 36' for receiving the bottom stem 18'. The top of the housing assembly is provided with an opening 38' of sufficient size to permit the insertion or removal of the ball member. A bonnet 40' is secured to the housing assembly to close this opening 38' during normal operation of the valve. The bonnet 40' includes an axial passage 42' for receiving the top valve stem 16' and any extensions thereof. The ball member may be rotated by means of an actuating bar 60' or other means operatively connected to the stem 16'. The bonnet further includes the appropriate seals and packing 62' to prevent leakage.

Operation of the valve assembly shown in FIG. 5 is substantially the same as that described with respect to FIGS. 1-4. The compression springs may be of such size that sufficient pressure is exerted upon the ball member by the seating assembly when the valve is in the closed position, but little or no pressure is exerted thereon when it faces the flat side. A gap between the seating assembly and the ball member may exist in the latter position. Disassembly of the valve is accordingly greatly faciliated.

What is claimed is:

1. A ball valve comprising:

a housing assembly;
a valve chamber defined by said housing assembly;
an opening within said housing assembly providing access to said valve chamber;
a ball member positioned within said valve chamber, said ball member having a bore extending therethrough;
a first conduit in fluid communication with said valve chamber;
a second conduit in fluid communication with said valve chamber;
a detachable member secured to said housing assembly to allow removal of said ball member through said opening when said detachable member is removed from said housing assembly;
seating means within said housing assembly for sealingly engaging said ball member;
means resiliently urging said seating means towards said ball member;
means for rotating said ball member;
said ball member including a first external surface portion capable of sealingly engaging said seating means when positioned adjacent thereto when said ball member is rotated to a first rotational position, thereby preventing flow in a first direction from one of said conduits to the other of said conduits;
said ball member further including a second external surface portion which does not sealingly engage said seating means when positioned adjacent thereto in a second rotational position of said ball member, said ball membe being removable from said chamber without the necessity of retracting said seating means while in said second rotational position;
said ball member capable of being rotated to a third rotational position where said bore establishes fluid communication between said first and second conduits.

2. A valve as defined in claim 1 wherein said second external surface portion of said ball member is flat.

3. A valve as defined in claim 2 wherein said first external surface portion of said ball member is spherical.

4. A valve is defined in claims 1 or 2 wherein said first rotational position of said ball member is about ninety degrees from said third rotational position and about one hundred eighty degrees from said second rotational position.

5. A valve as defined in claims 1 or 2 wherein said housing assembly includes top and bottom portions, said detachable member being secured to the top portion of said housing assembly.

6. A valve as defined in claim 1 wherein said first external surface portion of said ball member is diametrically opposite from said second external surface portion thereof.

7. A valve as defined in claim 1 wherein said ball member includes first and second diametrically opposed valve stems projecting therefrom defining an axis of rotation of said ball member, said bore having a longitudinal axis substantially perpendicular to said axis of rotation.

8. A valve as defined in claim 1 wherein said means resiliently urging said seating means towards said ball member includes a plurality of compression springs.

* * * * *